July 28, 1959

S. P. JONES 2,896,658

REGULATOR-VAPORIZER FOR A LIQUEFIED
GAS CARBURETION SYSTEM

Filed Dec. 13, 1954

INVENTOR
Sam P. Jones
BY Ashley & Ashley
ATTORNEYS

July 28, 1959

S. P. JONES 2,896,658

REGULATOR-VAPORIZER FOR A LIQUEFIED GAS CARBURETION SYSTEM

Filed Dec. 13, 1954

INVENTOR.
Sam P. Jones
BY
*Ashley & Ashley*
ATTORNEYS

Sam P. Jones
INVENTOR.

BY Ashley & Ashley
ATTORNEYS

INVENTOR.
Sam P. Jones
BY
ATTORNEYS

United States Patent Office 2,896,658
Patented July 28, 1959

2,896,658

REGULATOR-VAPORIZER FOR A LIQUEFIED GAS CARBURETION SYSTEM

Sam P. Jones, Dallas, Tex.

Application December 13, 1954, Serial No. 475,653

16 Claims. (Cl. 137—340)

This invention relates to new and useful improvements in regulators and vaporizers for liquefied petroleum gas carburetion systems.

The invention is particularly concerned with regulators and vaporizers adapted for use in gas carburetion systems for internal combustion engines of the type employing liquefied petroleum gas, usually butane-propane gas mixtures.

Objectionable features have been encountered in the utilization of the several types of vaporizers and regulators presently being used in liquefied petroleum gas carburetion systems, among them being a considerable fire hazard in the event of failure of the regulator diaphragm, and more important, the tendency of the regulators to force gas into the carburetion system when the throttle is suddenly closed.

In the ordinary type of regulator, a diaphragm is employed for pressure regulation of the fuel gas which usually enters the regulator as a liquid and partially vaporizes during the pressure reduction step within the regulator. The failure of the regulator diaphragm as by rupture or otherwise permits this high pressure gas to escape and obviously creates an extreme fire hazard in addition to causing the unnecessary wastage of fuel gas.

It has also been found that the usual type of vaporizer, in which the partially vaporized butane-propane flow stream is passed in heat exchange relationship with the hot water present in the engine cooling system, causes both superheating of the vaporized gas and overloading of the carburetion system when the throttle is suddenly closed. There is normally a quantity of liquid propane and butane present in the vaporizer during normal operation, and this liquid is in contact with a warm or hot wall which has its opposite side contacted by the hot water from the engine cooling system. When the engine throttle is suddenly closed, the demand for fuel gas is reduced almost to zero, and gas is no longer withdrawn from the vaporizer. The liquid hydrocarbons remain in contact with the hot surface, however, and as they continue to vaporize, the pressure within the vaporizer necessarily increases. The increased pressure either causes the vaporized hydrocarbons to blow out into the carburetion system, thereby unnecessarily enrichening the fuel mixture and often causing the engine to stop and, in any event, causing the unnecessary wastage of fuel gas. If the structure of the carburetion system is such that the vaporized fuel cannot escape, then excessive pressures build up within the vaporizer and may well result in its damage or destruction.

It is therefore an important object of this invention to provide an improved vaporizer in which provision is made for withdrawing the liquid hydrocarbons from contact with the hot vaporizing surfaces as the demand for fuel gas diminishes and as pressure begins to build up within the vaporizer.

Another object of the invention is to provide an improved vaporizer having provision for blanketing the hot vaporizing surface with liquid hydrocarbons, thereby isolating the vaporized hydrocarbons from said surface and minimizing superheating of the gas vapors.

A further object of the invention is to provide an improved regulator and vaporizer in which rupture of the regulator diaphragm is prevented from resulting in excessive gas loss and the creation of a fire hazard, and yet a regulator structure in which adequate provision is made of the necessary movement of said diaphragm.

A still further object of the invention is to provide an improved regulator and vaporizer having a novel inlet orifice which is readily removed and replaced without requiring special instruments or tools.

A particular object of the invention is to provide an improved combination regulator and vaporizer formed into a unitary, compact, inexpensive structure which is both efficient and durable and which embodies the advantages referred to hereinabove.

Another object of the invention is to provide an improved regulator-vaporizer structure which is insertable as a unit in heat exchange relationship in a body of heat exchange fluid, such as contained in the water jacket of an internal combustion engine, with the housing of its vaporizer exposed to the heat exchange fluid and its regulator spaced from said fluid.

A further object of the invention is to provide an improved regulator-vaporizer structure wherein the vaporizer has an inner chamber communicating with the high pressure inlet of the regulator and an outer chamber communicating with the low pressure outlet of said regulator together with means establishing communication between the chambers and spaced from said inlet and outlet for causing flow through said chambers between said inlet and outlet.

Another object of the invention is to provide an improved vaporizer, of the character described, wherein the means establishing communication between the chambers is arranged to impart circumferential movement to the flow through the outer chamber.

A further object of the invention is to provide an improved vaporizer having an outer wall or housing exposed to a heating medium, such as a body of water, wherein the outer wall or housing is corrugated to provide substantially circumferential traps for catching the liquid constituents of the gaseous fuel stream and confining said liquids in substantially circular paths to assure vaporization of said liquids and isolation of the vapor constituents from the warmer portions of said wall so as to prevent excessive superheating of said vapors.

A construction designed to carry out the invention will be hereinafter described together with other features of the invention.

The invention will be more readily understood from a reading of the following specification and by reference to the accompanying drawings wherein examples of the invention are shown, and wherein.

This application is a continuation-in-part of my copending application, Serial No. 226,168, filed May 14, 1951, now abandoned.

Figure 1:
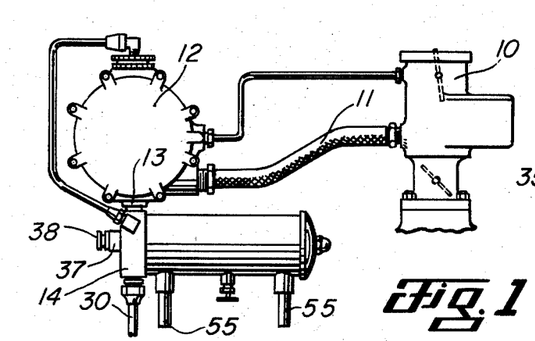
Fig. 1 is a side elevational view of a carburetion system having connected thereinto a regulator and vaporizer constructed in accordance with this invention.

In the drawings, as shown in Fig. 1, the numeral 10 designates a gas carburetor for an internal combustion engine (not shown) which is supplied with fuel gas, such as a butane-propane mixture, by a suitable conductor 11 leading to a balanced low pressure regulator 12. Although the regulator may be of any suitable or desirable type, the regulator shown is disclosed in my Patent No. 2,693,820, issued November 9, 1954. Fuel gas is supplied to the regulator 12 at an intermediate pressure through a lower fitting 13 and the high pressure regulator and vaporizer, forming the subject matter of this application, is connected to the fitting.

Figures 2, 3, 4, 5:
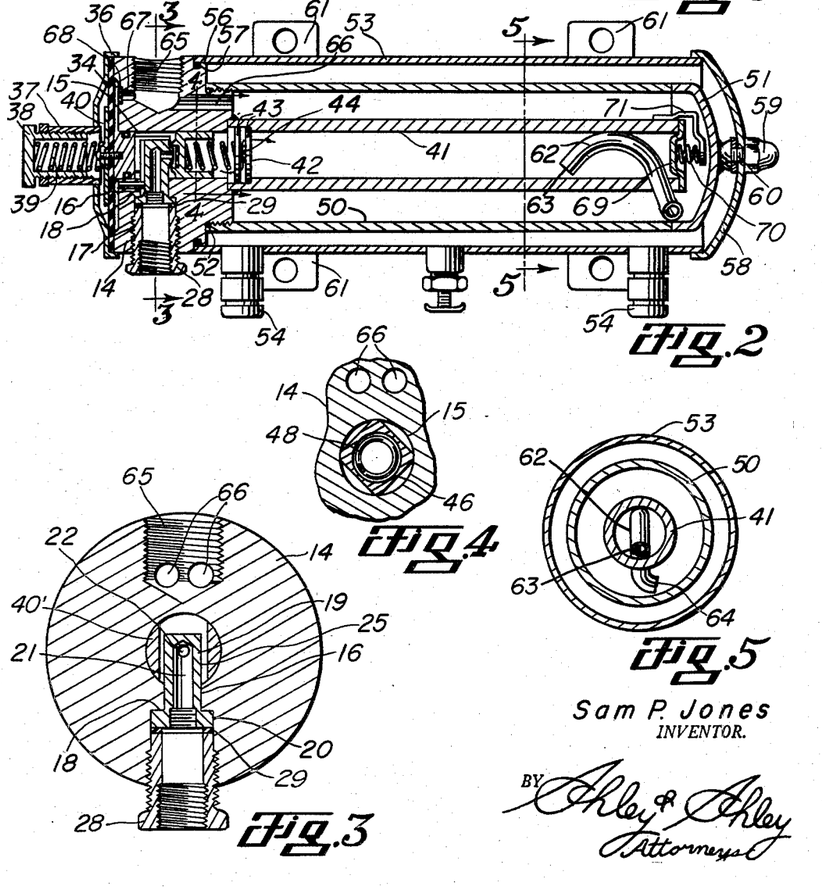
Fig. 2 is a longitudinal, sectional view of the regulator-vaporizer structure.
Fig. 3 is a cross-sectional view, taken on the line 3—3 of Fig. 2.
Fig. 4 is a fragmentary, cross-sectional view, taken on the line 4—4 of Fig. 2.
Fig. 5 is a cross-sectional view, taken on the line 5—5 of Fig. 2.
Figure 7:
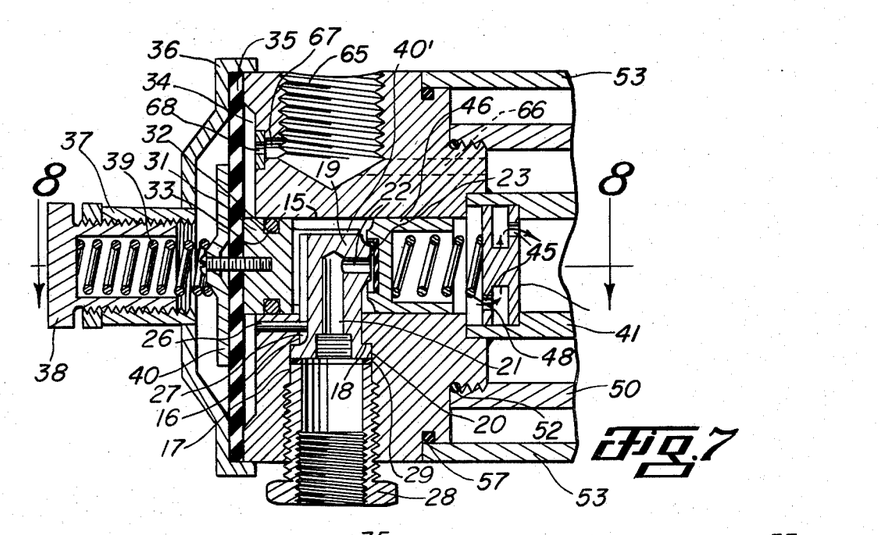
Fig. 7 is an enlarged, longitudinal, sectional view of the regulator structure.
Figure 8:
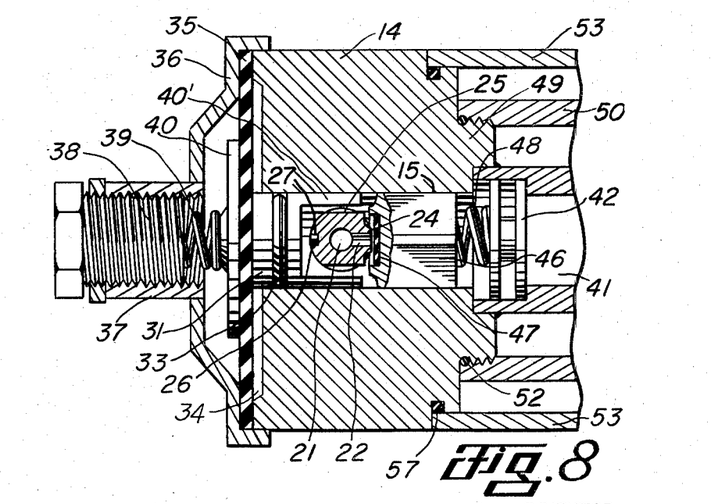
Fig. 8 is a horizontal, cross-sectional view, taken on the line 8—8 of Fig. 7.

The regulator and vaporizer structure is shown in detail in Fig. 2 and includes a substantially cylindrical regulator body 14 having an axial bore 15. A radial bore or lateral, inlet passage 16 extends downwardly or outwardly from the bore 15 through the outer wall of the body and has its lower or outer portion counterbored to form an enlarged bore 17 and a shoulder 18 at the intersection of the bores. An orifice member or gas inlet nipple 19 is mounted in the passage 16 and extends diametrically of the bore 15 (Figs. 3 and 7). The nipple is substantially cylindrical and is provided with an annular flange 20 in its lower or outer end which abuts the shoulder 18. A passage 21 extends axially of the nipple 19 from its lower or outer end to a point near its upper or inner end and communicates with a radial passage 22 extending through the side of said nipple. The passage 22 extends to the right side of the inlet nipple through a valve seat 23 formed upon a flattened face 24 of said nipple. As shown in Figs. 3 and 8, the lateral faces of the nipple 19 are also flattened at 25. A guide pin 26 is carried by the regulator body 14 and projects into the passage 16 for engagement within a groove 27 extending longitudinally of the nipple to assure the proper orientation of said nipple. The lower or outer end of the passage 17 is screw-threaded for receiving a screw-threaded tubular plug or bushing 28, the upper end of which urges a gasket 29 against the lower end of the nipple 19 to hold said nipple securely in position. As shown in Fig. 1, the bushing 28 receives a fuel supply line 30 leading from a fuel storage tank (not shown). It is noted that the passage 22 is positioned substantially concentrically within the axial bore 15 of the body and that the valve seat 23 faces toward the right or inner end of said bore.

A yoke plunger 31 is slidably engaged in the left or outer end of the axial bore and is provided with a circumferential groove 32 for receiving an elastic O-ring 33 of rubber or other suitable material. The O-ring seals the annular space between the cylindrical plunger 31 and the wall of the bore 15 so as to prevent the escape of fuel therethrough. A circular, shallow recess 34 is formed in the left or outer end of the body 14 concentrically of the bore 15 and a suitable pressure-responsive member or diaphragm 35 overlies the recess. Although the plunger 31 normally bears against the center portion of the diaphragm 35, it is noted that the area of said plunger is appreciably less than the area of said diaphragm exposed to the recess 34. In actual practice, the ratio of these areas is about 1 to 4.

Figure 6:
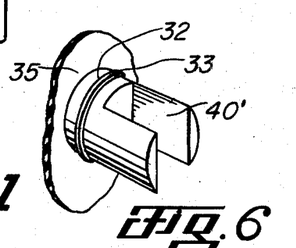
Fig. 6 is a fragmentary perspective view showing the central portion of the regulator diaphragm and the yoke connected thereto.

A domed cap 36 is secured to the body 14 for clamping the marginal portion of the diaphragm to said body. The central portion of the cap 36 is open and carries an axially projecting sleeve 37 in which a hollow plug or gland 38 is screw-threaded. A helical spring 39, confined within the plug 38, constantly urges a disk 40 against the central portion of the diaphragm 35 to hold said diaphragm in engagement with the left or outer end of the plunger 31. If desired, a screw or other suitable fastening means may extend through the diaphragm between the disk 40 and plunger to clamp said diaphragm therebetween. Upon its opposite end, the plunger 31 carries a pair of legs 40' forming a yoke which straddles the upstanding or inner portion of the inlet nipple 19. As shown in Figs. 3 and 6, the adjacent or inner surfaces of the legs 40' are flat so as to conform to the flattened faces 25 of the inlet nipple and the outer surfaces of said legs are arcuate so as to have a sliding fit within the axial bore 15. The legs normally extend beyond the nipple but, when the diaphragm 35 moves outwardly toward the cap 36, the axial movement of the plunger 31 in the bore withdraws said yoke legs from this position.

An inner chamber in the form of an elongated, cylindrical tube 41 is secured to the body 14 and extends therefrom in axial alinement with the bore 15 as shown in Fig. 2. It is noted that the chamber formed by the tube may be referred to as a cold chamber and has a relatively thick wall and, as will be explained, a closed outer end. The axial bore of the tube 41 is enlarged adjacent the body to receive and confine a spider 42 comprising a pair of spaced, parallel disks 43 separated by a central core 44 and having openings 45 adjacent their margins. The openings in the spaced disks are misaligned with each other to provide a liquid trap so that fluid may pass therethrough from the bore 15 but is retarded from flowing in a reverse direction from the bore of the tube 41. This is accomplished by placing the opening 45 in the lower portion of the disk 43 adjacent the bore and the opening in the upper portion of the disk adjacent the tube. Thus, liquid cannot flow from the tube 41 back into the bore 15 until it reaches the level of the opening disposed in the upper portion of said tube.

A valve block or element 46 is reciprocable in the bore 15 between the spider 42 and the inlet nipple 19, the valve block being substantially square in cross-section and having its corner edges rounded for sliding engagement with the bore 15 (Fig. 4). An axial, recessed valve disk 47 is carried in the end of the block 46 and is adapted to engage the valve seat 23 of the nipple (Fig. 8). A helical spring 48, confined between the valve block and the spider 42, constantly urges said valve block and its disk toward the valve seat 23. It is manifest that when the diaphragm 35 functions to move the plunger 31 outwardly of the bore, the legs 40' of the plunger function to move the valve block and its disk from engagement with the seat 23 or to permit the spring 48 to move said block into engagement with said seat.

The body 14 carries an enlarged, screw-threaded boss 49 concentrically surrounding its axial bore at the right or inner side of said body (Figs. 2, 7 and 8) for receiving an elongated cylindrical housing 50 which projects outwardly therefrom in spaced, enclosing relation to the tube 41. A dished head 51 closes the outer end of the housing and is spaced axially a slight distance from the outer end of the tube. In order to seal the screw-threaded joint between the boss 49 and housing 50, a suitable elastic O-ring 52 is disposed in the threaded joint. The housing constitutes a warm chamber and is adapted to be surrounded by a body of hot water or other heat exchange fluid contained in a chamber or jacket, such as an elongated cylinder 53 which encloses said housing and which has hot water inlet and outlet fittings 54. As shown in Fig. 1, suitable hose 55 connect the fittings to the cooling system of the internal combustion engine.

The portion of the body 14 concentrically surrounding its boss 49 is reduced in diameter to provide an annular shoulder 56 for receiving the inner end of the cylinder 53 and a suitable elastic O-ring 57 is carried by the shoulder to seal the joint between said body and cylinder. A dished cap or head 58 closes the outer end of the cylinder and is held in position by a nut 59 screw-threaded on a bolt 60 welded or otherwise secured to the medial portion of the head 51 of the housing. With this arrangement, the housing 50 is secured to the body 14 and the cylinder 53 with its dished cap 58 is clamped to said body by means of the bolt 60 and nut 59. Suitable brackets 61 may be provided on the cylinder to facilitate the mounting of the vaporizer adjacent the engine structure.

The fuel flow stream is conducted from the interior of the tube 41 into the interior of the housing 50 by means of a curved pipe or conductor 62. As shown in Figs. 2 and 5, the pipe extends through the lower portion of the wall of the tube and its inner portion within said tube is curved through approximately 90 degrees. The pipe 62 is disposed so as to have its inner, curved portion in a substantially vertical or upright plane within the tube 41 and its open inlet end 63 near the bottom portion of the wall of said tube. The outer or lower portion of the pipe, which extends into the housing, projects from the lower wall portion of the tube to the lower wall portion of said housing and is bent laterally whereby the outlet end 64 of said pipe is directed circumferentially of said housing. Thus, fuel passing through the pipe 62 is caused to flow circumferentially of the housing and to pass in a spiral or helix through said housing inwardly toward the body 14.

For permitting the flow of fuel to the low pressure regulator 12, a radial, screw-threaded passage or port 65 extends from the upper end of the body to a point adjacent the bore 15 and communicates with the interior of the housing 50 by means of one or more passages or ports 66 extending laterally from the lower or inner end of the passage 65 to the outer surface of the boss 49 and longitudinally between said housing and the tube 41 (Figs. 2 and 4). Of course, the passage 65 receives the fitting 13 so as to complete the path of flow for the fuel. A lateral passage or port 67 is provided between the passage 65 and diaphragm recess 34 and an orifice plate 68, having an opening of very small diameter, is pressed into the outer end of the passage 67 (Figs. 2 and 7). In actual practice, the diameter of the opening in the orifice plate is of the magnitude of 1/32 of an inch so that said opening functions merely as an equalizing passage in order to permit proper flexing of the diaphragm 35.

In the operation of this regulator and vaporizer, the butane-propane fuel is supplied through the line 30 to the bore 21 of the inlet nipple 19. When atmospheric pressure exists within the interior of the housing 50, and within the recess 34 due to the passages 66 and 67, the diaphragm 35 is flexed far enough to the right or inwardly by means of the spring 39 to force the plunger 31 and its legs 40' to the right or inwardly and move the valve block 46 and its valve disk 47 from engagement with the valve seat 23. The flow stream at this point is largely liquid, but as the fuel passes through the passage 22 and undergoes pressure reduction, some of the fuel is vaporized so that the stream entering the tube 41 is a liquid and gas mixture. As pointed out hereinbefore, the flow stream is directed through the spider 42 and passes through the openings 45 into the cold chamber constituted by the interior of the tube.

From the tube, the fuel flows through the curved pipe 62 into the housing 50 and passes in a helical or spiral path over the inner wall of said housing toward the passages 66. Of course, the housing is maintained at an elevated temperature by reason of the surrounding hot water jacket 53 and, as the liquid fuel is vaporized, the vapors pass longitudinally of the annulus between the tube 41 and housing to the passages 66. From the latter, the vapors are withdrawn through the passage 65 to the low pressure regulator 12 and, after further pressure reduction, are delivered to the carburetor 10 through the conductor 11. Due to the circumferentially directed outlet 64 of the pipe, the liquids of the fuel stream are forced outwardly and form a liquid blanket which spreads over the inner surface of the housing 50 and flows thereover in a helix, effectively isolating the relatively warm wall of said housing from the vapors of said stream. In this manner, superheating of the fuel is prevented because it is withdrawn from contact with the housing wall as soon as it passes into the gaseous phase. Of course, at very low rates of fuel withdrawal, the velocity of flow of the liquid fuel stream may not be sufficient to blanket the entire interior of the housing, but at all normal operating rates of fuel usage, this desirable result is obtained.

When the throttle of the engine is closed and the rate of fuel consumption is diminished, the rate of withdrawal of gaseous fuel through the passages 66 is reduced, and the liquid fuel remaining in contact with the housing 50 tends to vaporize faster than the gaseous fuel which is being withdrawn. Hence, the pressure within the housing commences to increase and the diaphragm 35 is urged to the left or outwardly, compressing the spring 39 and allowing the plunger 31 also to move to the left or outwardly so as to stop or restrict the passage of fuel through the valve seat 23. If the period of reduced fuel consumption continues for some time, or the decrease in consumption is rapid and of appreciable magnitude, the pressure within the vaporizer increases rapidly due to vaporization of liquid fuel present therein, and may quickly exceed the desired limits. When this occurs in the conventional type of vaporizer, the vaporizer is either damaged or destroyed, or the excess fuel is forced through the passage 65 and the low pressure regulator 12 into the carburetor 10. This suddenly enriched mixture passing to the engine often causes the same to die and, in any event, results in a wastage of fuel. In heavy equipment, such as city buses and the like which employ a form of fluid drive, the engine cannot be readily restarted through the forward momentum of the vehicle and resort must be had to the usual electric starter.

With the present invention, however, these difficulties are eliminated since the liquid fuel is withdrawn from the warm chamber and from contact with the hot wall of the housing 50 as soon as pressure begins to build up in said chamber. The pipe 62, having its outlet 64 disposed closely adjacent the bottom wall portion of the housing, picks up the liquid fuel and said fuel is forced into the interior of the tube 41 by reason of the pressure increasing within said housing. The heating and vaporization of the liquid fuel takes place in the housing and it is in the space between said housing and the tube that the pressure increase occurs. Of course, as soon as the flow of fuel stops, the liquid fuel drains to the bottom of the housing 50 and, as it continues to vaporize because of its contact with the hot housing wall, the pressure it creates functions to force it through the curved pipe into the cold zone inside of the tube. Thus, the liquid fuel is removed from contact with the hot housing wall and the vaporization ceases and, hence, there is no wastage of fuel and no supplying of an overly rich mixture to the engine. As soon as the engine load is resumed, the liquid fuel returns through the pipe 62 to the inside of the housing and operation continues in the normal fashion.

An important feature of the invention is to be found in the arrangement of the diaphragm 35 and the plunger 31. Diaphragms sometimes rupture or develop leaks and, in the conventional regulator, this not only wastes gas but creates a considerable fire hazard. Should the regulator diaphragm of the present structure rupture in some fashion, there can be no escape of gas except through the very small opening of the orifice plate 68. It is manifest that only an extremely small quantity of gas would thus be released to the atmosphere whereby the wastage of gas and the creation of a fire hazard would be kept at a minimum. The provision of the O-ring 33, surrounding the plunger 31, prevents the escape of gas around said plunger and further has the very important function of causing the plunger to assume the regulator duties of the diaphragm 35. Since the area of the plunger is less than the area of the diaphragm, manifestly, a higher pressure is maintained within the housing 50. Regardless of this, however, the pressure so established has a definite limit dependent upon the size of the plunger and the strength of the spring 39, and, in any event, the full storage tank pressure of over one hundred pounds per square inch is never admitted to the interior of the vaporizer. It is obvious that pressures of this magnitude would be extremely harmful to the vaporizer and might cause a serious accident. With the present arrangement, however, the pressure increases to a certain predetermined maximum and is prevented from rising above that level. The spring 48 is of sufficient strength to withstand full storage tank pressure applied through the passage 22 and, hence, the plunger 31 assumes a regulator function and continues to control the pressure within the housing until such time as the diaphragm 35 is replaced or repaired.

Preferably, the outer end of the cold chamber or tube 41 is closed by a dished cap 69 held in place by a compression spring 70 confined between the cap and an angular bracket 71 extending from said tube. Normally, the cap 69 remains at all times in engagement with the tube so as to close the end of the same, but under certain conditions, said cap may move slightly from said tube to permit a fuel flow. Such conditions are encountered when the engine throttle is opened suddenly after a prolonged idling period. After the engine has idled for some time, substantially all fuel in a liquid state will have been exhausted from the vaporizer and gaseous fuel will be withdrawn directly from the high-pressure regulator contained in the body 14. This occurs because the rate of fuel flow is very low and vaporization takes place at the valve seat 23. As the throttle of the engine is gradually opened, liquid and gaseous fuel enters the cold chamber or tube and flows through the pipe 62 to the housing 50, the pipe being adequate to handle this flow.

When, however, the engine throttle is suddenly opened under these conditions, fuel entirely in the gaseous state must pass through the pipe 62 until fuel in the liquid state reaches said pipe from the high pressure regulator. This flow is insufficient for acceleration and causes the engine to hesitate or hold back a moment before picking up speed or power. The spring-pressed cap 69 functions to relieve this condition by opening and permitting direct flow of fuel gas from the cold chamber or tube to the housing 50. At other times, the cap remains engaged with the tube since the pressure differential is not sufficient to displace said cap. In this manner, an immediate supply of fuel is provided for acceleration from a prolonged idling period.

Figure 9:
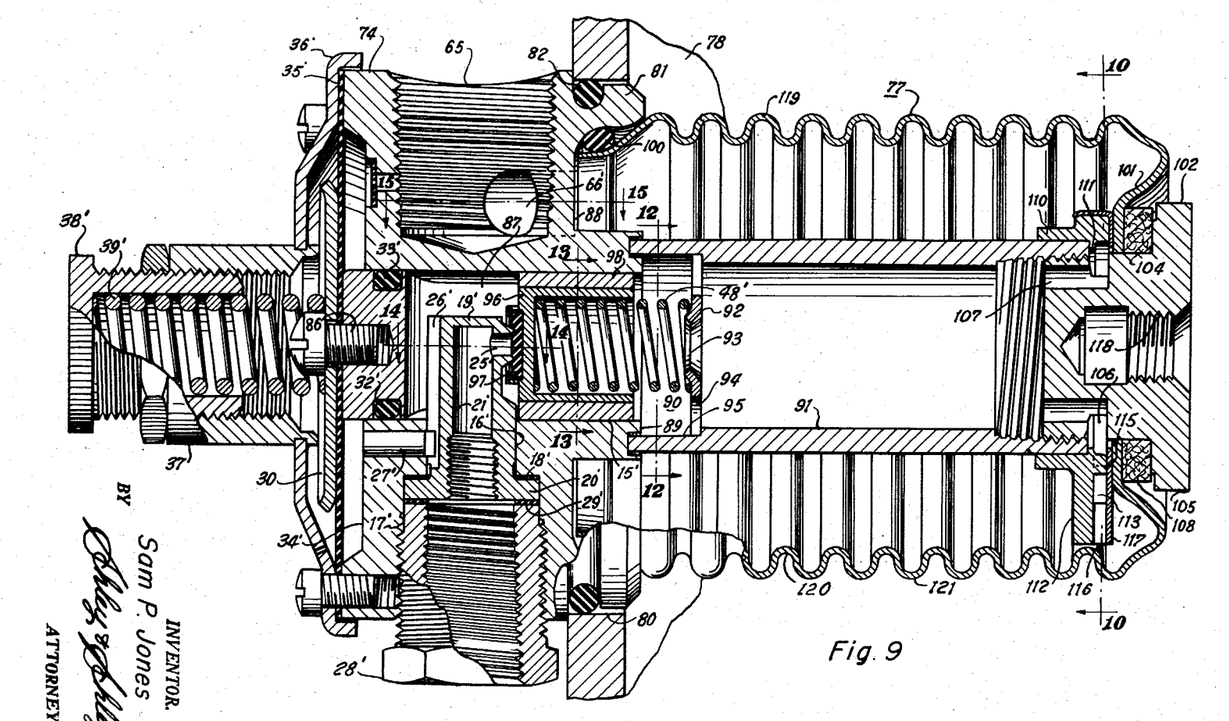
Fig. 9 is an enlarged, longitudinal, sectional view of a modified regulator-vaporizer structure.
Figure 10:
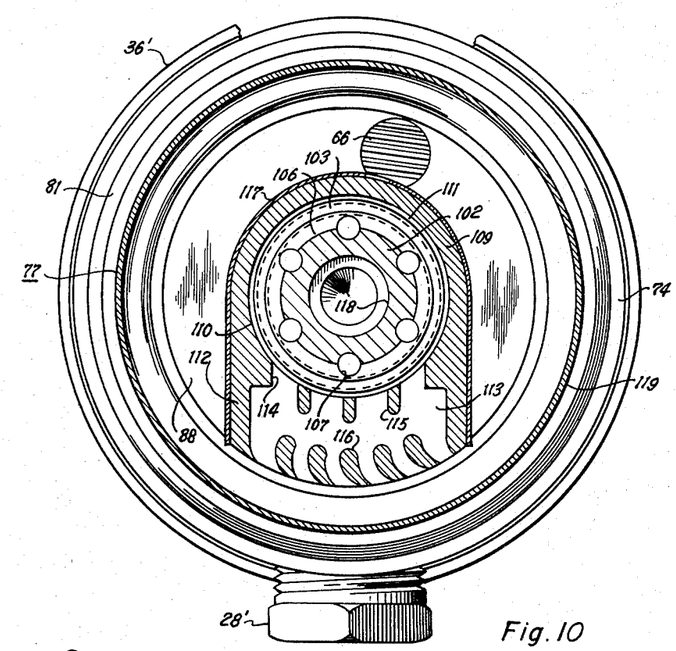
Fig. 10 is a transverse, vertical, sectional view, taken on the line 10—10 of Fig. 9.
Figure 11:
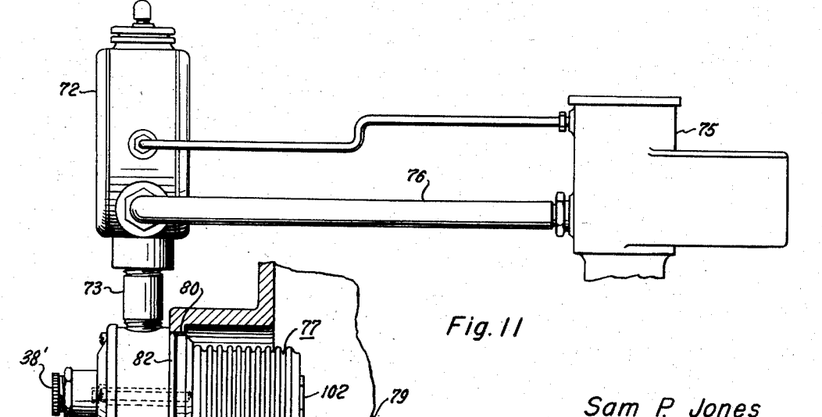
Fig. 11 is a side elevational view, partly in section, showing the modified regulator-vaporizer structure mounted in the boss of a water jacket and connected in a carburetion system.
Figure 13:
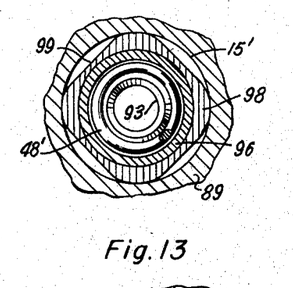
Fig. 13 is a transverse, vertical, sectional view, taken on the line 13—13 of Fig. 9.
Figure 14:
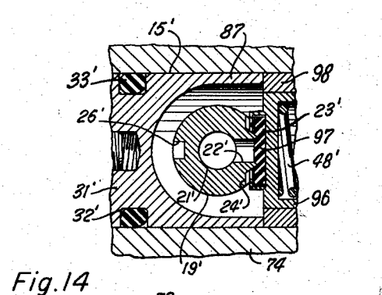
Fig. 14 is a horizontal, cross-sectional view, taken on the line 14—14 of Fig. 9.
Figure 15:
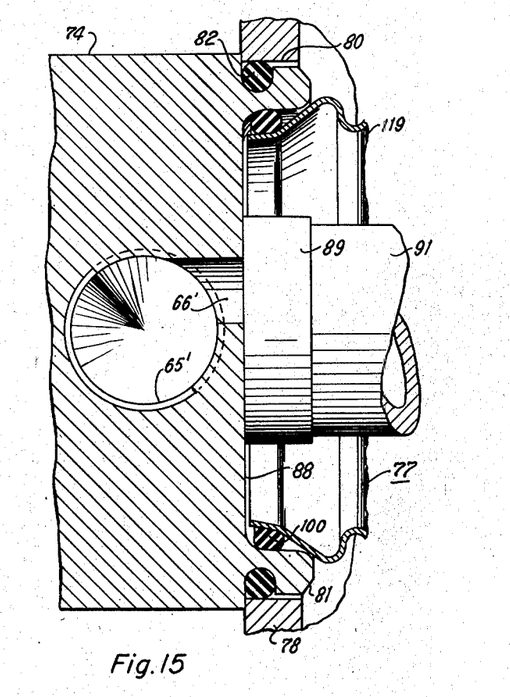
Fig. 15 is a horizontal, cross-sectional view, taken on the line 15—15 of Fig. 9.
Figure 16:
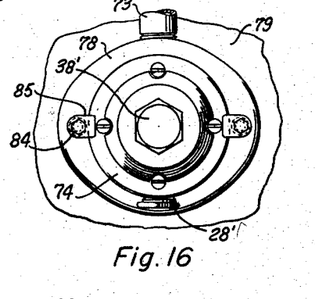
Fig. 16 is an end elevational view showing a typical mounting of the modified structure.

In Figs. 9 through 15, a modified high pressure regulator-vaporizer structure is shown and includes a substantially cylindrical regulator body 74 adapted to be connected by a fitting 73 to a balanced low pressure regulator 72. The latter supplies a gaseous fuel, such as a butane-propane gas mixture, to the gas carburetor 75 of an internal combustion engine through a suitable conductor 76 (Fig. 11) all of which elements are similar to the carburetor 10, conductor 11, low pressure regulator 12, fitting 13 and high pressure regulator body 14. As will be more fully explained, a vaporizer housing 77 is carried by one end of the body 74 and is adapted to be inserted in a chamber containing hot water, such as a boss 78 made integral with the water jacket 79 of the engine so that the housing may be positioned directly in the hot water. The water jacket boss has an internally-flanged, or shouldered, circular opening 80 for receiving an annular, external flange or boss 81 formed on the inner end of the body concentrically of the housing and an elastic O-ring 82 is confined upon the flange in sealing engagement with the opening (Figs. 9, 11 and 15). For securing the regulator-vaporizer structure to the boss 78, the lateral portions of said boss are of increased wall thickness to accommodate screw-threaded openings 83 for receiving screws 84 upon which angular brackets or clips 85 are mounted so as to overlie the body 74 and clamp said structure in place (Fig. 16). Of course, the structure may be mounted and secured in any suitable manner so long as the vaporizer housing 77 is exposed to the water in the jacket 79 and the regulator body is rigidly supported for sustaining the low pressure regulator 72.

Since the body 74 is substantially identical to the body 14, similar numerals identify substantially identical elements or parts and the openings thereof. The latter include an axial bore 15', communicating radial bore or lateral inlet passage 16', counterbore 17' and shoulder 18', gas inlet nipple 19' and flange 20', axial and radial passages 21' and 22', valve seat 23', flattened face 24', longitudinal groove 26', guide pin 27', bushing 28', and gaskets 29' on both sides of the flange 20'. A similar yoke 31', having a circumferential groove 32' and O-ring 33', is slidably mounted in the left or outer end of the axial bore and may be connected by a screw 86 to a diaphragm 35' and disk 30' overlying a concentric recess 34', held in place by a dished cap 36', axial sleeve 37', hollow plug 38', and spring 39'. Legs 87, similar to the legs 40', are carried by the plunger 31' for straddling the inner portion of the gas inlet member 19' and have arcuate outer surfaces conforming to and having a sliding fit in the bore 15' (Figs. 9 and 14).

Figure 12:
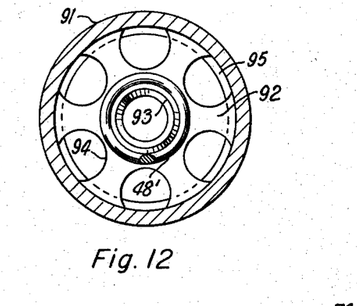
Fig. 12 is a transverse, vertical, sectional view, taken on the line 12—12 of Fig. 9.

The body 74 has an annular, coaxial recess 88, which is relatively wide and deep, between its axial bore 15' and external flange 81 to provide an annular boss or collar 89 surrounding said bore and having a concentric groove 90 in which the inner end of a thick-walled tube 91 is suitably secured. It is noted that the tube 91 is surrounded by the housing 77 and is similar to the tube 41 and provides a similar cold chamber. A circular plate or spider 92, having an axial, inwardly-flanged opening 93 and a plurality of peripheral orifices or ports 94, is mounted in the inner end portion of the bore of the tube 91 which is enlarged as shown at 95 (Fig. 12). The spider is adapted to confine a cylindrical valve block or element 96, similar to the valve block 46, in the bore 15' with its axial valve disk 97 in engagement with the valve seat 23' in coaction with a helical spring 48'. A liner or sleeve 98, having external, flattened, longitudinal surfaces 99, surrounds the valve block which may have a press fit therein whereby said block and sleeve undergo movement relative to the axial bore of the body 74 (Fig. 13).

Figure 17:
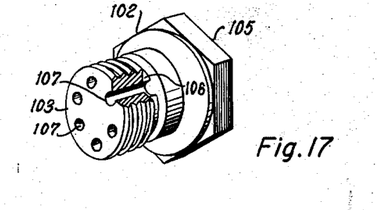
Fig. 17 is a perspective view of the closure plug for the inner tube of the vaporizer.

The inner end of the housing 77 engages within the recess 88 of the body in surrounding spaced relation to the tube 91 and an elastic O-ring 100 is confined between the external flange 81 and said housing inner end for sealing off therebetween. An internal, radial flange 101 is formed on the outer end of the housing for confinement by a flanged plug 102 screw-threaded in the outer end of the tube 91 whereby the inner end of said housing is held in the recess 88. The plug is most clearly shown in Fig. 17 and includes a screw-threaded inner end portion 103, an intermediate, annular shoulder 104 and an external head or flange 105. A circumferential groove 106 is formed in the plug 102 between its inner end portion and shoulder in communication with a plurality of axially-extending openings or ports 107 provided in said inner end portion adjacent its periphery and communicating with the interior of the tube 91. The shoulder 104 is adapted to receive a packing ring 108, of suitable material, for confinement between the housing flange 101 and the plug head 105 so as to seal off between the housing and plug.

For directing the fuel from the tube and the communicating ports 107 and groove 106 of the plug to the interior of the vaporizer housing 77, a diverter fitting or spray head 109 is provided and has an annular collar 110 with an internal head 111 in its bore for engagement with the outer end of said tube (Fig. 9 and 10). A radial extension or transverse nozzle 112 projects outwardly, preferably downwardly, from the collar of the spray head into close proximity to the wall of the housing 77 and has an opening or throat 113 communicating with the bore of said collar through a plurality of openings or passages 114 formed by spaced fins 115. The width of the nozzle 112 is substantially equal to the external diameter of the collar 110 and the width of its throat 113 may be greater than the internal or bore diameter of said collar. A plurality of arcuate vanes 116 are disposed in the mouth of the throat for directing the fuel circumferentially or tangentially of the housing, and a complementary cover plate 117 overlies the outer end of the spray head 109 to close the outer side of the collar bore and throat and confine the flow of fuel thereto. The cover plate is flanged and is adapted to be engaged with the head by sliding thereover. It is noted that the cover plate 117 is clamped between the collar 110, fins 115 and vanes 116 of the head and the flange 101 of the housing by the plug head 105 and packing ring 108 and that the internal bead 111 of its bore limits engagement of said collar to permit flow from said bore through the passages 114 to the throat 113. If desired, the outer end of the plug 102 may be provided with an axial, screw-threaded socket 118 for receiving a stud (not shown) to position and support the regulator-vaporizer. The spray head 109 serves the same purpose as and functions in substantially the same manner as the pipe 62.

From the vaporizer housing 77, the fuel is directed to the low pressure regulator 72 by a radial, screw-threaded passage or port 65' in the upper end of the regulator body 74, receiving the fitting 73 and communicating with the interior of said housing through a longitudinal passage or port 66' extending tangentially to the lower or inner end of the passage 65' (Fig. 15). A lateral passage or port 67' connects the passage 65' to the diaphragm recess 34' and has an orifice plate 68', similar to the plate 68. It is noted that the housing has a relatively thin wall 119 which is corrugated circumferentially and preferably has inner and outer, annular corrugations or undulations 120 and 121 which are relatively shallow. Obviously, the corrugated wall provides an amplified surface for heat exchange relation to the water in the jacket 79 and the outer corrugations function as traps for catching the liquids of the fuel stream flowing through the housing from the spray head 109 to the passages 66' and 65'. Of course, the outer corrugations 121 are the warmest portions of the housing wall 119 due to their projection and the substantially surrounding relation of the water in the jacket. The liquids are thrown outwardly by centrifugal force, while the gas or vapors readily flow over the inner corrugations 120, whereby said liquids are heated and vaporized so as to move inwardly into and be picked up by the gaseous fuel stream. Manifestly, the liquids blanket the housing wall and particularly its outer corrugations to prevent overheating of the gas or vapors.

Although the circumferential corrugations of the housing wall represent an important feature of the invention and are preferable, it is noted that said corrugations need not be annular and disposed diametrically of said wall. In order to vaporize the liquids efficaciously, it is essential to confine and whirl the same in fixed planes or substantially circular paths whereby said liquids are not picked up and carried along the wall of the housing by the gaseous fuel stream as is the case when said wall is smooth and uninterrupted. Of course, this function is best performed by a plurality of independent, annular, diametrically-disposed, outwardly-directed corrugations. The temperature of the gaseous fuel supplied to the engine is substantially uniform over a wide range of engine load and minimum variation of said temperature is due, in part, to the separate paths of travel of the liquid and vapor constituents of said fuel within the vaporizer housing. While the gas travels in a spiral with a high helix angle, the path of the liquids is circular. By passing back through the regulator body 74, the temperature of the effluent fuel is kept more nearly constant due to said fuel contacting the cold chamber or tube 91 as well as said body whereby the excessive superheat of said fuel is transferred to said tube and body. Of course, the thickness of its wall, together with its exposure to the expanded, cool gas and condensed liquids prevent heating of the tube.

Figure 18:
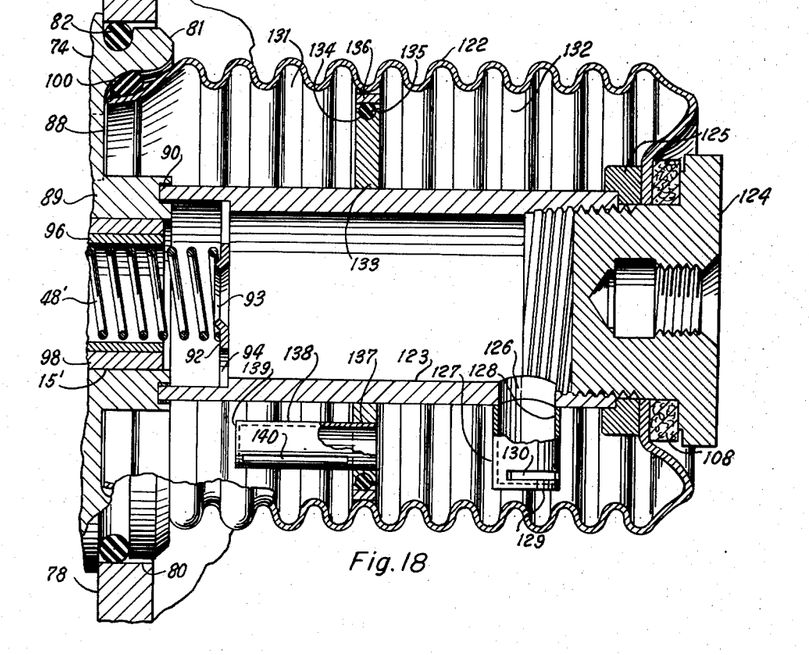
Fig. 18 is an enlarged, longitudinal, sectional view of a further modified vaporizer structure.

A modified vaporizer structure is shown mounted on the regulator body 74 in Fig. 18 and includes a substantially identical corrugated housing 122 and a similar tube 123 and closure plug 124. The latter is identical to the plug 102 except for the omission of the groove 106 and ports 107. A flanged collar 125 is substituted for the spray head 109 to seal off between the housing and tube. A circular opening or port 126 is provided in the lower portion of the tube 123 adjacent its closed, outer end for directing the fuel from said tube to the interior of the housing 122 and an external, cylindrical nozzle or nipple 127 projects radially from said tube in communication with the port. It is noted that the port 126 is of relatively large diameter and that the nozzle 127 has a bore 128 of substantially equal diameter so as to form a continuation thereof. The outer end of the nozzle is closed as shown at 129 and terminates adjacent the wall of the housing. A transverse outlet opening or slot 130 is formed in the wall of the nozzle 127 adjacent its closed outer end for directing the fuel circumferentially of the housing in substantially the same manner and for the same purpose as the curved pipe 62 and spray head 109. Preferably, the slot 130 is directed at an angle between its longitudinal wall and plugged outer end whereby the fuel is discharged at this angle and contacts the outer end portion of said wall prior to flowing inwardly thereof in a helical path.

The interior of the housing 122 is divided into a pair of annular chambers 131 and 132 by a diametric plate or transverse partition 133 carried by and surrounding the intermediate portion of the tube 123. A circumferential groove 134 is formed in the periphery of the partition for receiving an elastic O-ring or other seal ring 135 to sealingly engage an annular band or ring 136 suitably secured to one of the inner corrugations of the wall of the housing. The partition 133 has a transverse, circular opening 137 formed in its lower portion with one end of a cylindrical nozzle or nipple 138 engaged therein and extending longitudinally between and in spaced relation to the housing and tube and inwardly toward the regulator body 74. The nozzle has its inwardly-directed end closed as shown at 139 and a longitudinal opening or slot 140 is formed in the lower portion of said nozzle for directing the fuel circumferentially of the inner chamber 131 of the housing in a relatively broad stream. Due to the partition, the liquid constituents of the fuel are confined within the outer chamber 132 and are prevented from entering the inner chamber by the nozzle 138 being spaced from the housing wall. The primary purpose of the nozzle is to increase the capacity of the vaporizer by increasing the velocity of the flow so as to implement the circumferential movement to the fuel. In addition to whirling the liquids within the outer corrugations, bubbles are prevented from collecting on the inner surface of the housing wall by the sweeping action of the increased flow velocity which quickly removes the bubbles.

Figure 19:
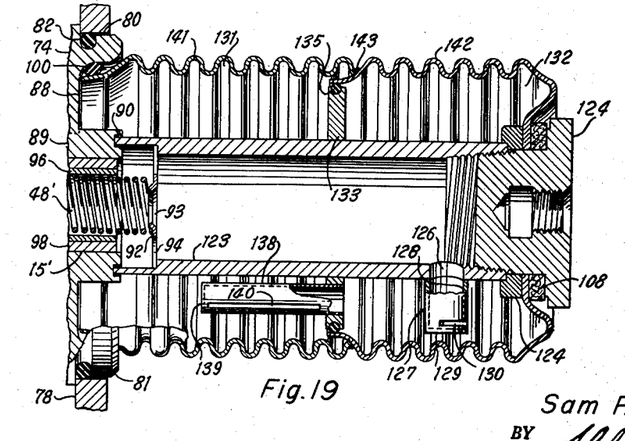
Fig. 19 is a longitudinal, sectional view of another modified vaporizer structure.

Another modified vaporizer structure is shown mounted on the regulator body 74 in Fig. 19 and includes the tube 123, plug 124, collar 125, port 126, nozzle 127, inner and outer chambers 131 and 132, partition 133, O-ring 135 and nozzle 138 shown in Fig. 18. Instead of the housing 122, a pair of inner and outer, cylindrical, corrugated sections 141 and 142 are suitably secured together as shown at 143 to provide a continuous housing for this modification. The inner end of the outer housing section 142 telescopes within the outer end of the inner section 141 and engages over and is sealed by the O-ring 135 carried by the partition 133, while the inner end of said inner section is confined within the recess 88 of the regulator body. This construction permits elongation of the housing and positioning of the O-ring.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A vaporizer for a liquefied petroleum fuel gas carburetor system including a closed housing adapted to be subjected to a source of heat for heating the walls of the housing and establishing a warm zone in said housing, a closed tube disposed within and surrounded by said housing, the tube having an inlet from the exterior of the vaporizer and an outlet passage spaced from its inlet and opening into said housing, and means for expanding fuel gas into said tube through its inlet for establishing a cold zone in said tube, said housing having an outlet spaced from the tube outlet passage for discharging warm vaporized fuel gas from said housing, said tube outlet passage opening into said housing adjacent the bottom thereof for conducting liquid fuel from said housing back into said tube under pressure created by continued vaporization within said housing after the fuel demand is reduced so as to retard vaporization in said housing and the discharge of fuel gas through the housing outlet until the fuel demand is increased.

2. A vaporizer as set forth in claim 1 wherein the outlet passage extends laterally from the tube for imparting circumferential movement to the fuel gas flowing through the housing from said tube outlet passage to the housing.

3. A vaporizor as set forth in claim 1 wherein the tube has its inlet at one end thereof and its opposite end closed, the tube outlet passage being adjacent the closed end of said tube and the housing outlet at the opposite end of the housing.

4. A vaporizer as set forth in claim 1 wherein the housing includes a wall surrounding the tube in spaced relationship and having circumferential corrugations for trapping the liquid constituents of the fuel gas to assure vaporization thereof.

5. A vaporizer as set forth in claim 1 wherein the housing includes a wall surrounding the tube in spaced relationship and having a corrugated contour to provide substantially circumferential traps for catching the liquids of the fuel gas to assure vaporization thereof.

6. A vaporizer as set forth in claim 1 including partition means extending transversely between the tube and housing to provide a pair of chambers in said housing, the tube outlet passage communicating with one of the housing chambers and the housing outlet communicating with the other housing chamber, the partition means having means establishing communication between said housing chambers and directing the fuel gas circumferentially of said chamber communicating with said housing outlet.

7. A vaporizer as set forth in claim 1 including pressure-responsive means closing one end of the tube.

8. A vaporizer as set forth in claim 1 wherein the tube outlet passage has its inner end adjacent the bottom of the tube.

9. A vaporizer as set forth in claim 1 wherein the tube outlet passage includes a curved pipe extending through the wall of the tube with its inner end adjacent the bottom of the tube and its outer end adjacent the bottom of the housing.

10. A vaporizer for a liquefied petroleum gas fuel carburetor system including a closed housing adapted to be subjected to an external source of heat for heating the walls of the housing and establishing a warm zone in said housing, a closed tube disposed within and surrounded by said housing in spaced non-heat exchange relationship thereto, the tube having an inlet and an outlet passage spaced from its inlet and opening into said housing, said housing having an outlet spaced from the tube outlet passage for discharging warm vaporized fuel gas from said housing, and a pressure-reducing regulator having a diaphragm exposed to the housing outlet, the regulator having a fuel gas inlet and an outlet opening into said tube through the tube inlet for expanding fuel gas into said tube and establishing a cold zone therein.

11. A vaporizer as set forth in claim 10 wherein the tube outlet passage extends transversely from the tube and has its outer end adjacent the bottom of the housing for conducting liquid fuel from said housing back into said tube under pressure created by continued vaporization within said housing after the fuel demand is reduced so as to retard vaporization in said housing and the discharge of fuel gas through the housing outlet until the fuel demand is increased.

12. A vaporizer as set forth in claim 10 wherein the housing includes a wall surrounding the tube in spaced relationship and having circumferential corrugations for trapping the liquid constituents of the fuel gas to assure vaporization thereof.

13. A vaporizer as set for in claim 10 wherein the housing includes a wall surrounding the tube in spaced relationship and having a corrugated contour to provide substantially circumferential traps for catching the liquids of the gas to assure vaporization thereof.

14. A vaporizer as set forth in claim 10 including partition means extending transversely between the tube and housing to provide a pair of chambers in the housing, the tube outlet passage communicating with one of the housing chambers and the housing outlet communicating with the other housing chamber, the partition means having means establishing communication between said housing chambers and directing the fuel gas circumferentially of the housing chamber communicating with the housing outlet.

15. A vaporizer as set forth in claim 10 wherein the tube outlet passage extends laterally from the tube adjacent its bottom.

16. A vaporizer as set forth in claim 10 wherein the tube is positively connected to the housing and regulator, said housing being clamped to said regulator, and an O-ring confined and sealing off between said housing and regulator.

(References on following page)

References Cited in the file of this patent

UNITED STATES PATENTS

| | | |
|---|---|---|
| 1,436,099 | Hill | Nov. 21, 1922 |
| 1,726,020 | Garvey | Aug. 27, 1929 |
| 1,949,374 | Johnson | Feb. 27, 1934 |
| 2,031,379 | Mathieu | Feb. 18, 1936 |
| 2,163,139 | Brandon | June 20, 1937 |
| 2,166,912 | Little | July 18, 1939 |
| 2,231,525 | Breitling | Feb. 11, 1941 |
| 2,242,424 | Fisher | May 20, 1941 |
| 2,294,107 | Beck | Aug. 25, 1942 |
| 2,516,218 | Kerr | July 25, 1950 |
| 2,561,506 | Garretson | July 24, 1951 |